(No Model.)

A. WOOD.
BORING MILL.

No. 497,739. Patented May 16, 1893.

Witnesses

Inventor
Aurin Wood,
By his Attorney
Rufus B. Fowler

UNITED STATES PATENT OFFICE.

AURIN WOOD, OF WORCESTER, MASSACHUSETTS.

BORING-MILL.

SPECIFICATION forming part of Letters Patent No. 497,739, dated May 16, 1893.

Application filed December 20, 1892. Serial No. 455,848. (No model.)

*To all whom it may concern:*

Be it known that I, AURIN WOOD, a citizen of the United States, and a resident of Worcester, in the county of Worcester and State of Massachusetts, have invented a new and useful Improvement in Boring-Mills, of which the following is a specification, reference being had to the accompanying drawings, in which—

Figure 1:
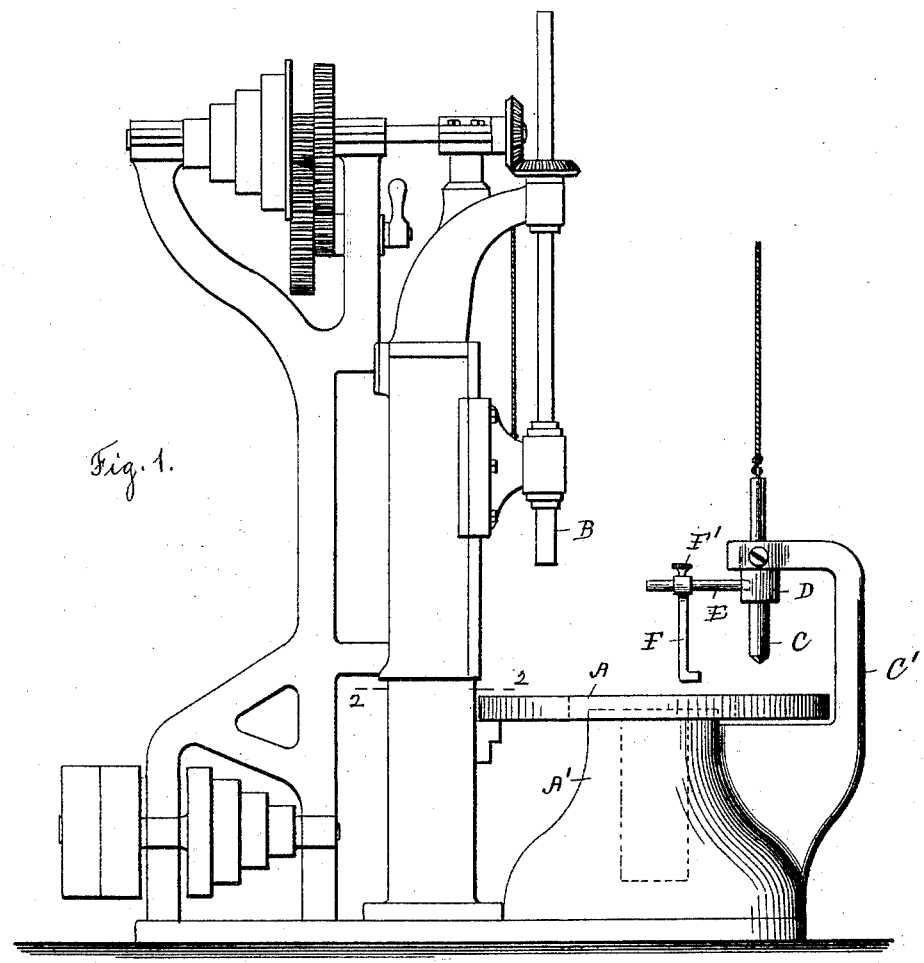
Figure 2:
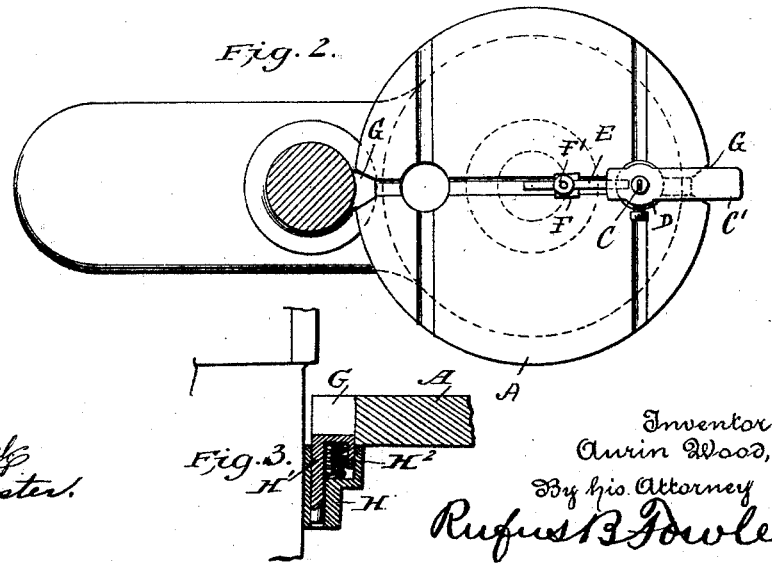
Figure 3:
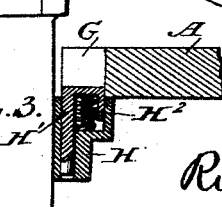

Figure 1 is a side elevation of a boring mill, embodying the essential features of my invention. Fig. 2 is a top view of the revolving table represented in Fig. 1, the upper portion of the post of the drilling mechanism having been removed on line 2, 2, Fig. 1. Fig. 3 is a vertical, central, sectional view of the bracket projecting from the front side of the post and inclosing the spring actuated locking pin.

Similar letters refer to similar parts in the different figures.

My invention has for its object a more expeditious boring of pulleys, car-wheels, and similar work and also to provide means by which the work may be arranged to be brought by a single movement in position to be operated upon by the boring tool and these objects are accomplished by means of the construction and arrangement of the several operating parts as hereinafter described and specifically set forth in the annexed claims.

In the accompanying drawings I have represented a boring mill, having a single spindle and a rotating table upon which one piece of work is arranged, while the operation of boring another and separate piece of work is being performed.

Mechanism by which the rotating spindle carrying the cutting tools, is fed to the work, forms no part of my present invention and is therefore not shown in the drawings, such portions of the machine being shown as embody the essential feature of my invention.

Referring to the drawings, A denotes a revolving table, to which the work is attached in the usual and well known manner and by means of bolts, chucks, or such other devices as are now commonly employed for attaching work to the tables of boring mills and similar machines. The revolving table A, is journaled in a supporting base A', so as to be capable of rotation around a vertical axis parallel with the axis of a rotating drill spindle B, driven by connected mechanism which is common in drilling machines. The drill spindle B is placed at the same radial distance from the center of the revolving table as the center spindle C, which is held in an arm C' extending upward from the supporting base A'. The center spindle C having its axis at the same radial distance from the center of the revolving table A, as the axis of the drill spindle B enables the work to be placed upon the table A in such position that its "center" shall be coincident with the axis of the drill spindle as the table is rotated one-half a revolution, as the drill spindle B and center spindle C are placed upon diametrically opposite sides of the revolving table.

Upon the center of spindle C is a collar D, capable of turning upon the spindle C and provided with a radial arm E having a bar F attached by a set screw F', permitting a radial adjustment of the bar F upon the radial arm E. When work is placed in position on the table A, having a circular periphery concentric with the hole to be bored, the arm E is swung around the center spindle C with a bar F in proper position to determine the concentricity of the work to the center spindle C, but in case the center of the work is determined by a prick-punch, or otherwise, the arm E and bar F will not be required, as the proper position of the work can be determined by dropping the center spindle C and bringing the "center" of the work to coincide with the axis of the spindle.

The revolving table A represented in Fig. 2 of the drawings, is provided upon diametrically opposite sides, with notches G adapted to be engaged by a latch held in the framework of the machine and by which the table is locked in position while the operation of drilling is going on. By placing the notches G, G, on opposite sides of the table, the table can be rotated one-half a revolution, in order to carry the work, which has been attached to the table and with its "center" coincident with the axis of the spindle C around into proper position with the drill spindle.

Any known form of latching mechanism held in a fixed position and arranged to enter one of the notches G in the edge of the table, can be employed for locking the table in position, or a spring actuated pin can be held in the bracket shown in Fig. 1, as attached to the front side of the post of the drilling machine and beneath the edge of the rotating table. I do not, however, confine myself to any particular form of locking mechanism; but in Fig. 3 I have shown one form of a locking mechanism inclosed in the bracket H, attached to, and projecting from the side or the post of the boring mill. The bracket H incloses a chamber, in which is placed a latch H' pushed upward by a spiral spring $H^2$. The upper end of the latch H', is shaped to fit the notches G, G, and the edge of the table, so that when the table is rotated and one of the notches G is brought over the end of the latch H', it will be forced up into the notch and thereby hold the table from rotating. When it is desired to rotate the table one-half a revolution, the latch H' is pushed down, compressing the spring $H^2$ and as the table is rotated, the upper end of the latch bears against the under side of the table, holding the spring $H^2$ in a state of compression, until one of the notches G is brought directly over the latch H', when the spring will force the latch upward and as the notches G, G, are placed upon diametrically opposite sides of the table, the latching mechanism will lock the table at each half revolution.

What I claim as my invention, and desire to secure by Letters Patent, is—

1. In a boring mill, the combination of a revolving spindle, a revolving table upon which the work is supported and having its axis at one side of the axis of said revolving spindle, said table being provided with locking mechanism operatively connected with said table, by which each revolution of the table is divided into two, or more equal angular movements, means whereby the work is adjustably attached to said table and a centering mechanism arranged in correspondence with the axis of said revolving spindle and said locking mechanism, whereby the position of the work on said table is determined, substantially as described.

2. The combination in a boring mill, of a revolving table upon which the work is fastened, a revolving spindle with its axis parallel with the axis of said revolving table and upon one side of the axis of the table, a center spindle at the same radial distance from the axis of the table as the axis of the drill spindle and upon the opposite side of the table, substantially as described.

3. The combination in a boring mill, of a revolving table upon which the work is fastened, a revolving table with its axis parallel with and upon one side of the axis of said table, a centering mechanism arranged at the same radial distance from the axis of the table, as the axis of the drill spindle and means for attaching the work upon said table in the position as determined by said centering mechanism, substantially as described.

AURIN WOOD.

Witnesses:
RUFUS B. FOWLER,
CHARLES F. SCHMELZ.